US008355951B1

(12) United States Patent
Daniel

(10) Patent No.: US 8,355,951 B1
(45) Date of Patent: Jan. 15, 2013

(54) SYSTEM AND METHOD FOR MONETIZING BROADCAST MEDIA BASED ON THE NUMBER OF VIEWERS

(75) Inventor: Isaac S. Daniel, Miami, FL (US)

(73) Assignee: Lead Technology Capital Management, LLC, Miramar, FL (US)

( * ) Notice: Subject to any disclaimer, the term of this patent is extended or adjusted under 35 U.S.C. 154(b) by 293 days.

(21) Appl. No.: 12/702,762

(22) Filed: Feb. 9, 2010

Related U.S. Application Data

(63) Continuation-in-part of application No. 12/685,417, filed on Jan. 11, 2010.

(60) Provisional application No. 61/290,835, filed on Dec. 29, 2009.

(51) Int. Cl.

| | |
|---|---|
| ***G06Q 30/00*** | (2012.01) |
| *H04H 9/00* | (2006.01) |
| *H04N 7/16* | (2006.01) |
| *H04N 7/18* | (2006.01) |
| *H04N 5/228* | (2006.01) |
| *H04N 5/232* | (2006.01) |
| *G06F 21/00* | (2006.01) |
| *G06K 9/00* | (2006.01) |
| *G05B 15/00* | (2006.01) |

(52) U.S. Cl. ............. 705/14.69; 725/12; 725/10; 725/9; 348/135; 348/143; 348/152; 348/161; 348/208.1; 348/211.14; 713/186; 382/115; 382/118; 700/258; 700/259

(58) Field of Classification Search .................... 725/12, 725/9, 10; 348/135, 143, 152, 161, 208.1, 348/211.14; 713/186; 382/115, 118; 700/258, 700/259; 705/14.69
See application file for complete search history.

(56) References Cited

U.S. PATENT DOCUMENTS

| | | | | |
|---|---|---|---|---|
| 5,793,409 | A * | 8/1998 | Tetsumura | 725/12 |
| 7,134,130 | B1 | 11/2006 | Thomas | |
| 8,078,290 | B2 * | 12/2011 | Nelson | 700/17 |
| 2004/0222047 | A1 | 11/2004 | DiFranza | |
| 2005/0198661 | A1 * | 9/2005 | Collins et al. | 725/19 |
| 2006/0136962 | A1 | 6/2006 | Masaki | |
| 2007/0033607 | A1 * | 2/2007 | Bryan | 725/10 |
| 2008/0046930 | A1 * | 2/2008 | Smith et al. | 725/46 |
| 2008/0244639 | A1 | 10/2008 | Kaaz | |
| 2009/0079813 | A1 | 3/2009 | Hildreth | |
| 2010/0191369 | A1 * | 7/2010 | Kim | 700/235 |

OTHER PUBLICATIONS

Harry Wechsler, Reliable Face Recognition Methods: System Design, Implementation, and Evaluation, Copyright 2007, Published by Springer, ISBN-13:978-0387-22372-8.

John Vacca, Biometric Technologies and Verification Systems, Copyright 2007, Elsevier, Inc., Published by Butterworth-Heinemann, ISBN-13: 978-0-7506-7967-1.

(Continued)

*Primary Examiner* — Hoang-Vu A Nguyen-Ba
(74) *Attorney, Agent, or Firm* — Alberto Interian, III, Esq.

(57) ABSTRACT

A system comprising at least one processor, at least one sensor electronically connected to the at least one processor, at least one means for electronically connecting at least one broadcasting device to the system, wherein the at least one means for electronically connecting at least one broadcasting device is electronically connected to the at least one processor, and computer executable instructions readable by the at least one processor and operative to use the at least one sensor to determine how many persons or the identity of a person that is capable of perceiving a content broadcasted through at least one broadcasting device electronically connected to the system.

25 Claims, 12 Drawing Sheets

USING AT LEAST ONE SENSOR TO DETERMINE A NUMBER OF PERSONS OR AN IDENTITY OF A PERSON THAT IS CAPABLE OF PERCEIVING SENSORY PERCEIVABLE CONTENT.

↓

CONTROLLING THE CONTENT BASED ON HOW MANY PERSONS OR THE IDENTITY OF A PERSON THAT IS CAPABLE OF PERCEIVING THE CONTENT

OTHER PUBLICATIONS

Edited by Aurelio Campilho and Mohamed KamelImage, Analysis and Recognition, Copyright 2008, Published by Springer, ISBN-13: 978-3-540-69811-1.

Andrew T. Duchowski, Eye Tracking Methodology: Theory and Practice, Copyright 2007, Published by Springer, ISBN 978-1-84628-608-7.

* cited by examiner

SYSTEM AND METHOD FOR MONETIZING BROADCAST MEDIA BASED ON THE NUMBER OF VIEWERS

PRIORITY CLAIM

This patent application is a continuation-in-part patent application and claims priority to U.S. Non-Provisional patent application Ser. No. 12/685,417, titled "System and Method for Broadcasting Media," filed Jan. 11, 2010, and U.S. Provisional Patent Application Ser. No. 61/290,835, titled "Electronic Device and System and Method for Broadcasting Media," filed Dec. 29, 2009, both of which are hereby incorporated by reference as if fully stated herein.

FIELD

The present disclosure relates generally to electronic systems, and more particularly, to systems, methods, and various other disclosures related to broadcasting and playing media.

BACKGROUND

It is common practice for companies to issue site licenses to perceive certain broadcasted programs, such as movies, sports, and the like. Often site licenses contain limitations as to how many persons are allowed to watch the program. Thus far, the only way to ensure that the number of persons watching the program corresponds to the number of persons contained in the license is to physically limit how many persons may perceive the program. For example, only a certain amount of persons are allowed to enter a movie theatre, and the persons that are allowed in are limited to the persons who hold a ticket. The same goes for live sports events or other types of entertainment and educational events. Traditionally, there has been no way to monitor, nor limit the number of persons who watch a program at a remote location, such as a home or office, and thus site licenses have been difficult to enforce in remote locations.

Additionally, many companies refuse to allow individual persons to perceive new releases of programs, such as movie premiers and the like, because there is no way to ensure that only authorized persons will perceive the program.

SUMMARY

The various systems, methods, and embodiments described herein result from the realization that the number of persons who are perceiving a broadcasted program may be checked to see if it coincides with the number of persons in a license, by providing a system and method for determining how many persons and/or the identity of the persons that are perceiving the program.

Accordingly, the various embodiments and disclosures described herein solve the limitations of the prior art in a new and novel manner.

DETAILED DESCRIPTION OF PREFERRED EMBODIMENTS

System Level Overview

Figure 1A:
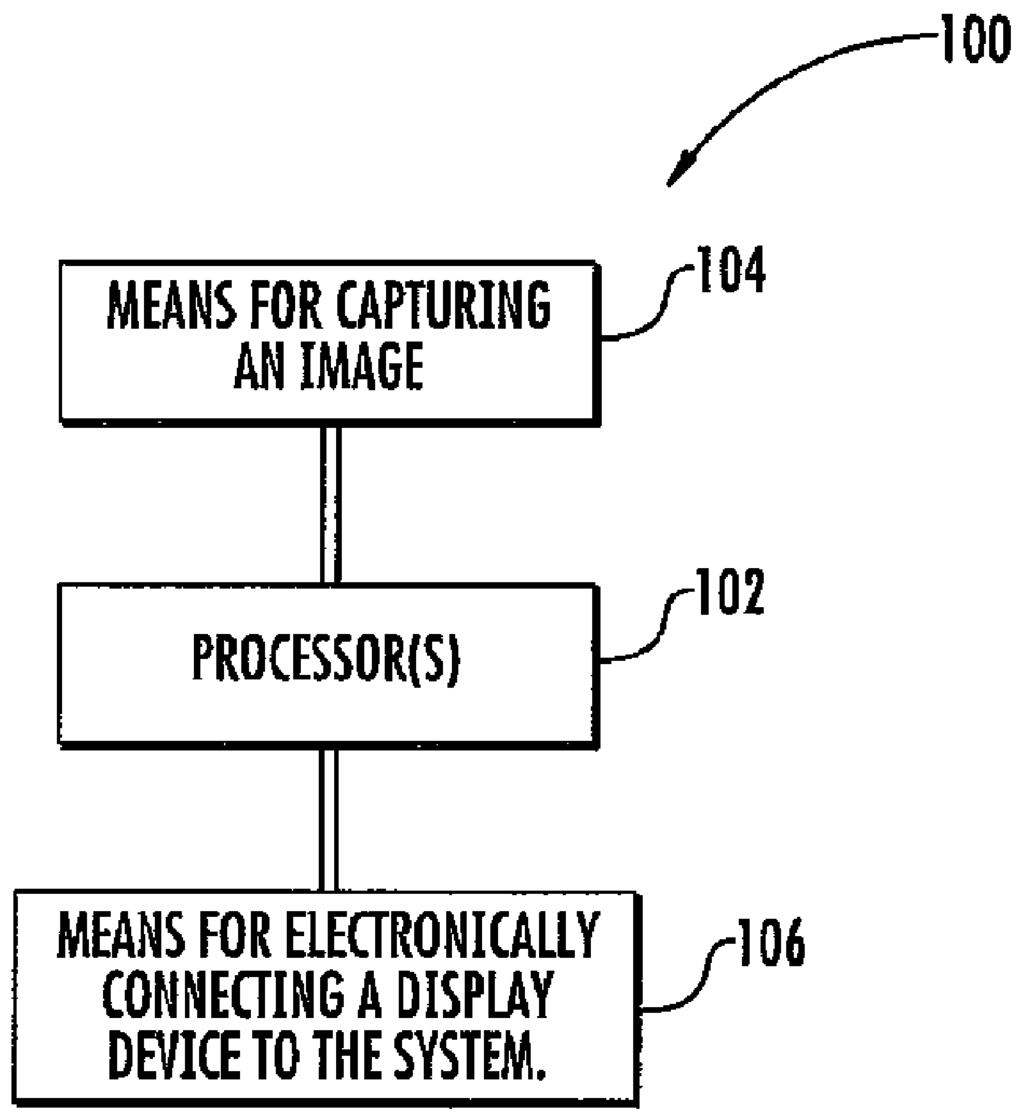
FIGS. 1A through 1E show a system in accordance with various embodiments.

FIGS. 1A through 1E show a system 100 in accordance with some embodiments. In one embodiment, as shown in FIG. 1A, system 100 comprises at least one processor 102, at least one means for capturing an image 104 (image shown with reference to numeral 108 in FIG. 1C), wherein the at least one means for capturing an image 104 may be electronically connected to the at least one processor, at least one means for electronically connecting a display device to the system 106, wherein the means for electronically connecting a display device may be electronically connected to the at least one processor, and computer executable instructions (not shown) readable by the at least one processor and operative to analyze at least one image captured by the at least one means for capturing an image, determine the number of persons (shown as 110 in FIG. 1C) that are in the at least one image, and control the content (shown as 116 in FIG. 1C) displayed on at least one display device connected to the system based on how many persons are determined to be in the at least one image.

The terms "electronically connected," "electronic connection," and the like, as used throughout the present disclosure, are intended to describe any kind of electronic connection or electronic communication, such as, but not limited to, a physically connected or wired electronic connection and/or a wireless electronic connection.

In some embodiments, the at least one processor 102 may be any kind of processor, including, but not limited to, a single core processor, a multi core processor, a video processor, and the like.

The means for capturing an image 104 may be any such means, such as, but not limited to, a camera, an infrared camera, a thermal imaging camera, a video sensor, a digital camera, a 3D camera, and the like. The means for capturing an image 104 may include a flash, which may be used to illuminate the subjects in the image. In preferred embodiments, the means for capturing an image 104 may include a field of view 118 that encompasses the same field of view as the display device 114 that may be connected to system 100.

Figure 1B:
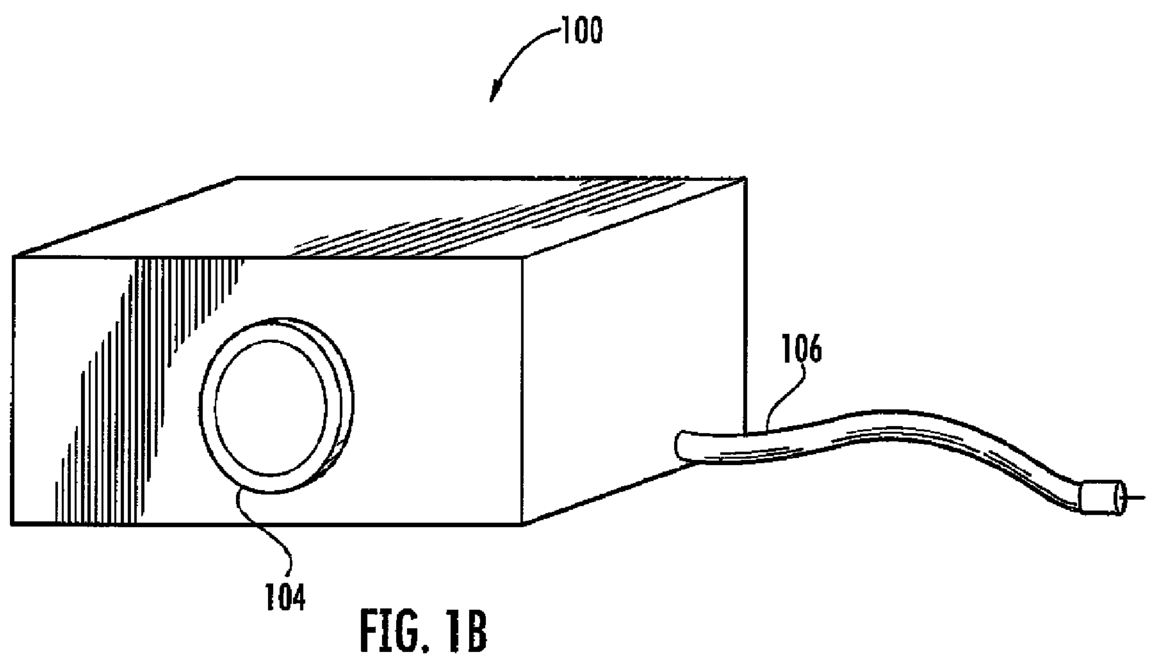

In some embodiments, the at least one means for electronically connecting a display device to the system 106 may be any kind of means, such as a video connector, a coaxial cable, an HDMI® (High Definition Multimedia Interface) cable, an s-video component connector, a WIFI® (WLAN) video transceiver, a BLUETOOTH® video transceiver, an internal video cable socket, a DVI connector, and the like. In FIG. 1B, means for electronically connecting a display device to the system 106 is shown to include a cable, but it should be noted that means 106 may include, or may not include a cable. The display device may be any kind of display device, such as, but not limited to, a television, a computer monitor, a projector, or any other kind of screen and/or display device.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA®, JAVASCRIPT®, HTML, XML, and other programming languages.

In one embodiment, the computer executable instructions may include image recognition software and/or firmware, which may be used to analyze the images captured and to determine the number of persons present in the image, and consequently in the image capturing means field of view. Such image recognition software may include facial recognition software, or may simply include general object recognition software.

The terms "object recognition software," "facial recognition software," and "image recognition software," as used throughout the present disclosure, may refer to the various embodiments of object recognition software known in the art, including, but not limited to, those embodiments described in the following publications: *Reliable Face Recognition Methods: System Design, Implementation, and Evaluation*, by Harry Wechsler, Copyright 2007, Published by Springer, ISBN-13: 978-0-387-22372-8*; Biometric Technologies and Verification Systems*, by John Vacca, Copyright 2007, Elsevier, Inc., Published by Butterworth-Heinemann, ISBN-13: 978-0-7506-7967-1; and *Image Analysis and Recognition*, edited by Aurelio Campilho and Mohamed Kamel, Copyright 2008, Published by Springer, ISBN-13: 978-3-540-69811-1*, Eye Tracking Methodology Theory and Practice*, by Andrew T. Duchowski, Copyright 2007, Published by Springer, ISBN 978-1-84628-608-7, all of which are herein incorporated by reference.

In some embodiments, the computer executable instructions may be further operative to compare the number of persons 110 that are determined to be in the at least one image 108 with a number of persons that are authorized to view the content 116 displayed on the at least one display device 114. In some embodiments, the number of persons that are authorized to view the content may be contained in a license to view the content 116. In other embodiments, the number of persons that are authorized to the view the content 116 may be received from a remote station, such as a television or movie service provider, in communication with system 100. In yet other embodiments, the number of persons that are authorized to view the content 116 may be contained on a piece of media hardware, such as a DVD, CD, and the like.

In a further embodiment, the computer executable instructions may be operative to control the content 116 displayed on the at least one display device 114 if the number of persons 110 determined to be in the at least one image 114 exceeds the number of persons authorized to view the content 116 displayed on the at least one display device 114. In some embodiments, controlling the content 116 displayed on the at least one display device 114 includes, but is not limited to, ceasing to display the content 116, pausing the content 116, playing the content 116, or continuing to display the content 116. In some embodiments, for example, if at the outset of the content's 116 display, the number of persons 110 who are determined to be watching exceeds the number of persons authorized to watch, the content 116 may not even begin playing. In further embodiments, if the number of persons 110 watching the content 116 at the outset is in accordance with the number of persons authorized to view the content 116, but at a later time exceeds the number authorized, the computer executable instructions may pause, freeze, or cease displaying the content altogether 116. In a further embodiment, if the number of persons 110 watching the content 116 at first exceeds the number authorized, but then later is reduced to or below the number authorized, the computer executable instructions may begin or continue displaying the content 116. The content 116 may be any kind of content, such as, but not limited to, a movie, a television show, a sports broadcast, such as a sports event, news, educational content, and the like.

In a further embodiments, system 100 comprises at least one means for communication with a local device, wherein the means for communicating with the local device may be electronically connected to the at least one processor 102. In some embodiments, such means may include a BLUETOOTH® module, a USB port, an infrared port, a network adapter, such as a WI-FI® (WLAN) card, and the like. The local device may be any kind of device, such as a television, a computer, a remote control, a telephone, a portable digital assistant, and the like.

In yet another embodiment, system 100 further comprises at least one means for communicating with a remote station, wherein the means for communicating may be electronically connected to the at least one processor 102. In some embodiments, the means for communicating with a remote station may be any kind of means, such as, but not limited to, a wireless modem, such as a GSM modem, a wired modem, an Ethernet adapter, a WI-FI® (WLAN) adapter, and the like. In some embodiments, the remote station may be a media service provider, such as, but not limited to, a television service provider, a movie provider, a sports media provider, an internet provider, a television station, a server computer, and the like. In such embodiments, the computer executable instructions may be further operative to use the at least one means for communicating with a remote station to transmit or receive information to or from the remote station. The information may include media content, such as television shows, sports broadcasts, movies, and the like. The information may also include how many persons are authorized to view the media content, billing information, and software updates. In some embodiments, a user, such as a person, may use system 100 to select and/or download the media to be viewed, and may select the amount of persons authorized to watch the media.

Figure 1C:
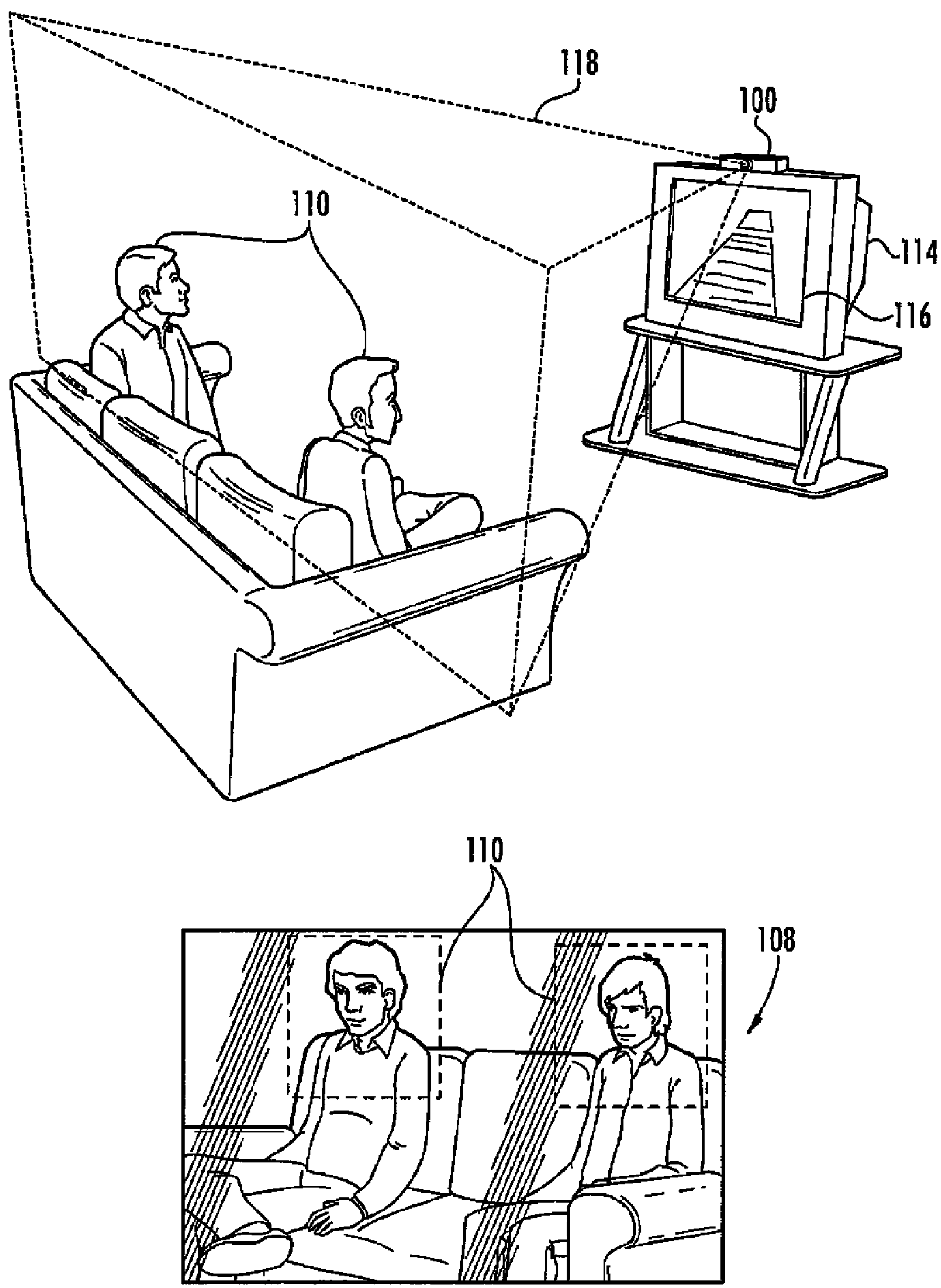
Figure 1D:
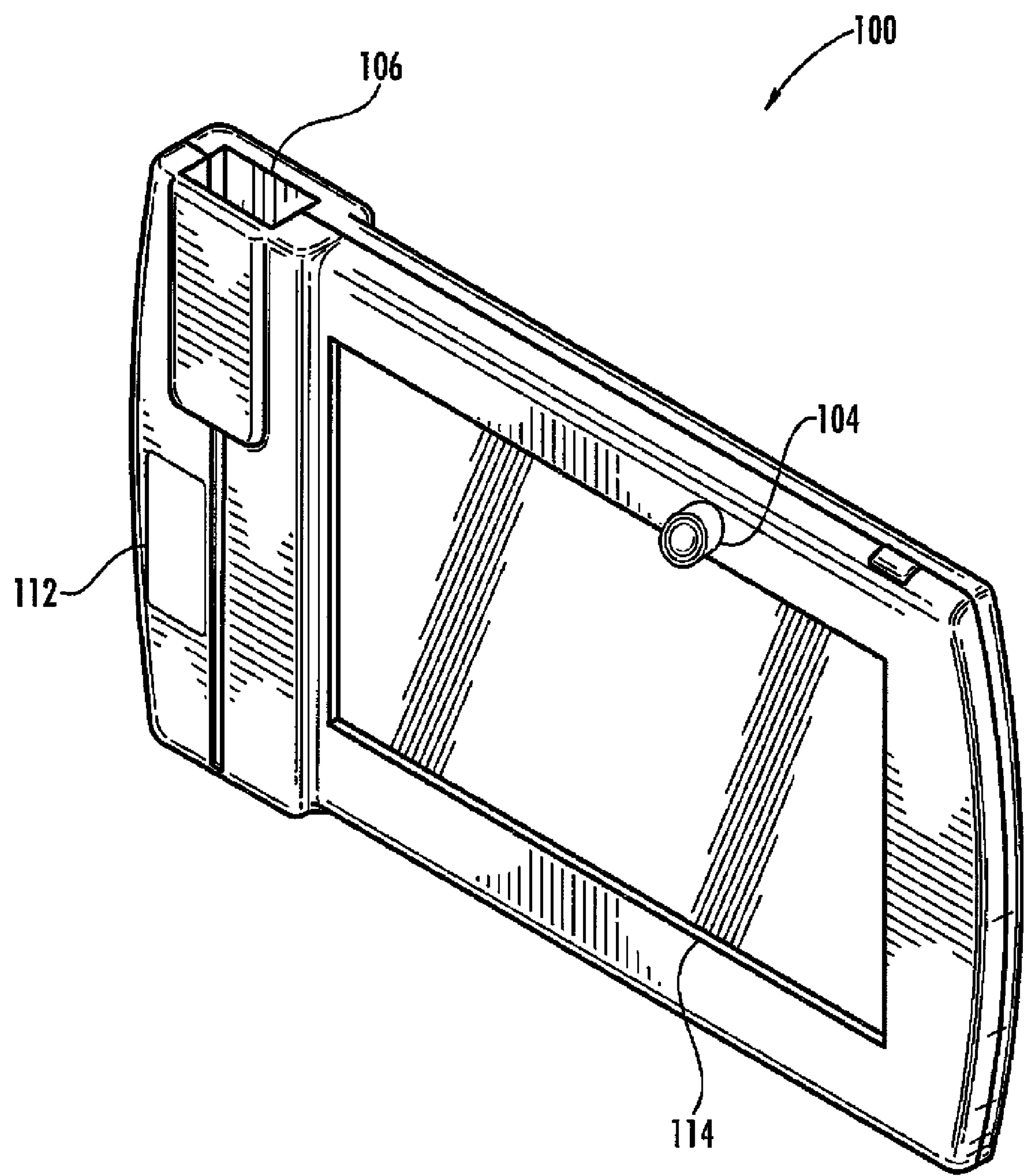
Figure 1E:
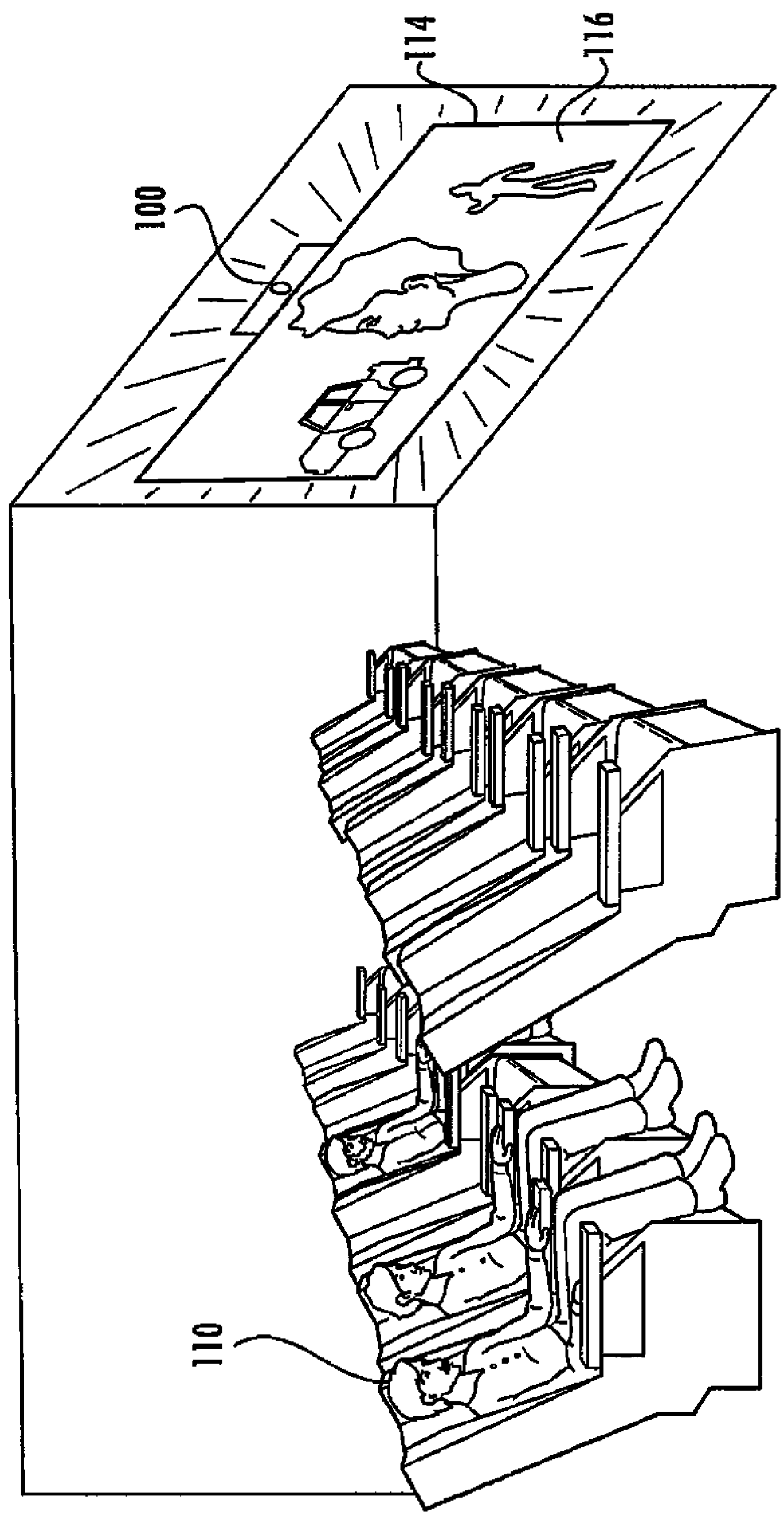

In one embodiment, system 100 may be positioned on or near a display device 114, such as a television or computer monitor (as shown in FIG. 1C). In other embodiments, system 100 may be positioned within, or integrated with a display device 114, such as a television, tablet computer (as shown in FIG. 1D), personal computer, laptop computer, and the like. In another embodiment, system 100 may be part of or positioned within a theatre, such as, but not limited to, a movie theatre (as shown in FIG. 1E), a home theatre, a hotel theatre, a mini theatre In some embodiments, system 100 may further comprise a means for receiving person input, which in some embodiments, may be any type of means, including, but not limited to: a telephone modem: a key pad, a key board, a remote control, a touch screen, a virtual keyboard, a mouse, a stylus, a microphone, a camera, a fingerprint scanner, and a retinal scanner. In a further embodiment, system 100 may include a biometric identification means 112 to identify the person perceiving the content, such as a fingerprint scanner, an eye scanner, and facial recognition software.

Figure 2A:
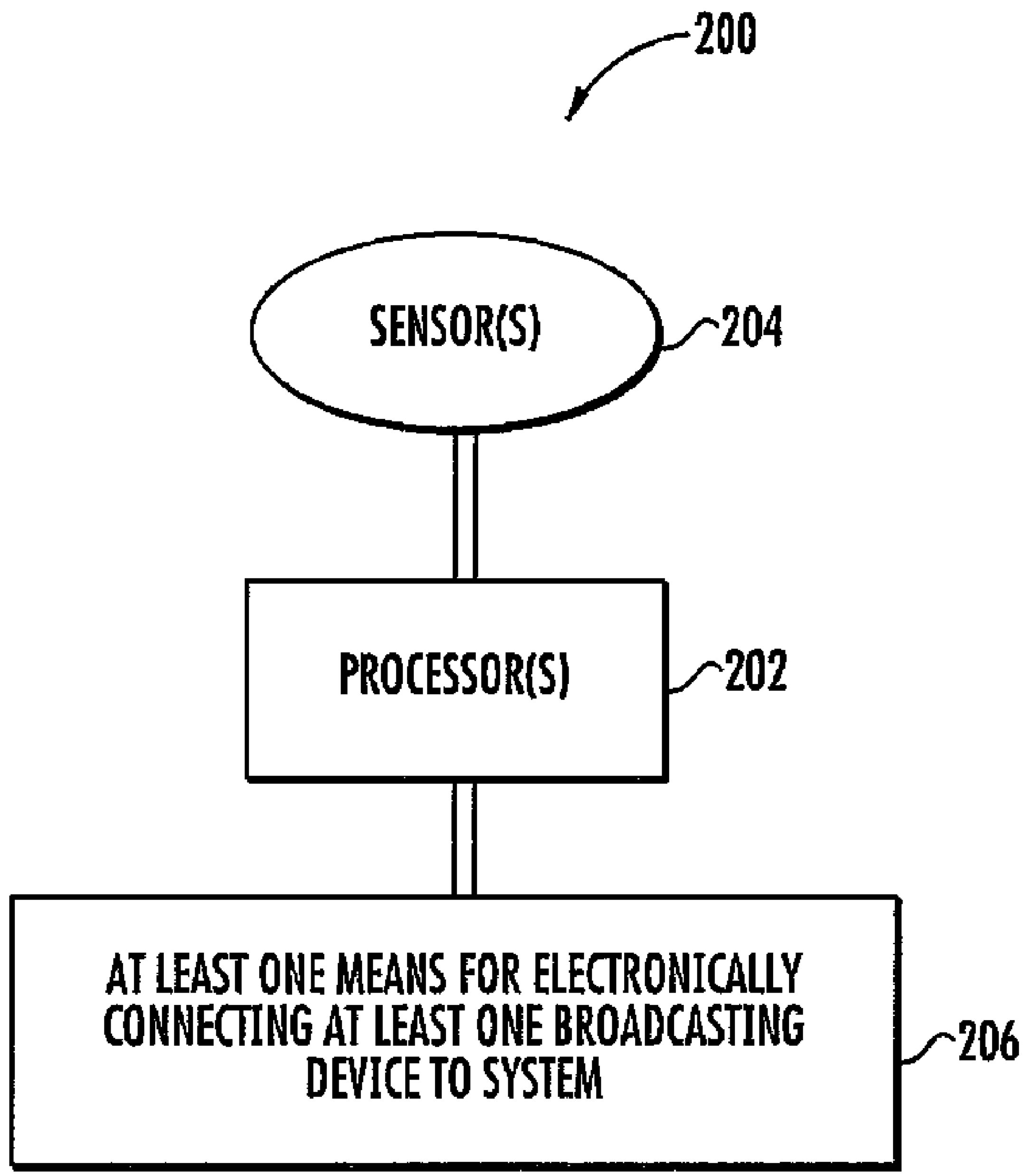
FIGS. 2A through 2E show a system in accordance with various embodiments.
Figure 2B:
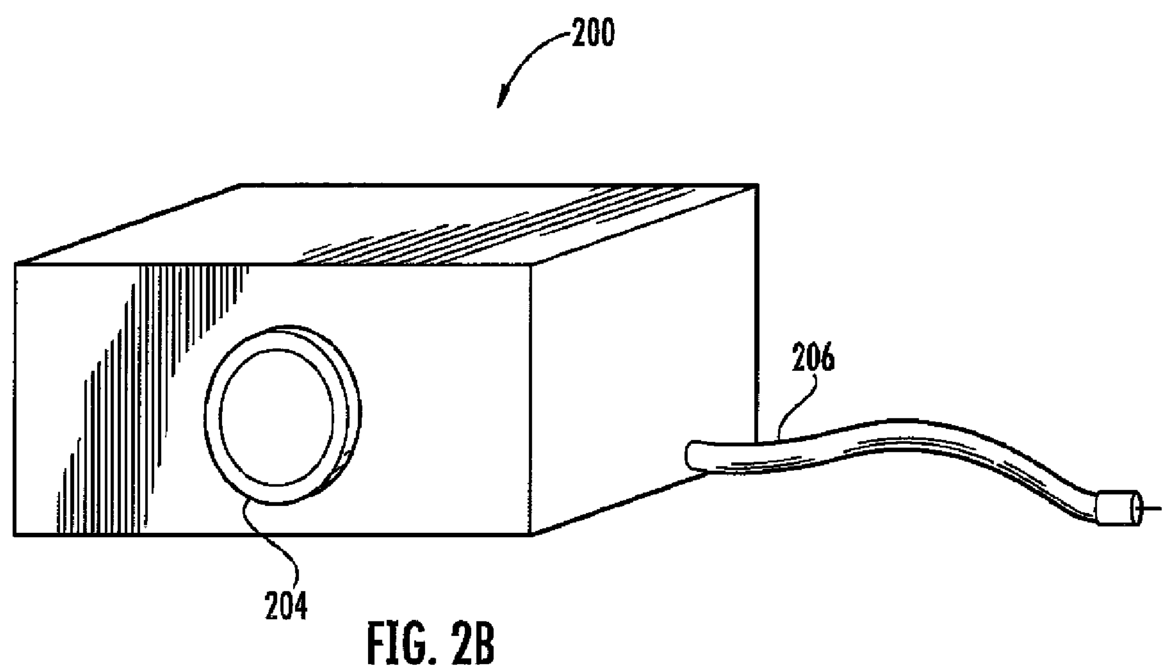

FIGS. 2A through 2E show system 200 in accordance with some embodiments. In one embodiment, as shown in FIG. 2A, system 200 comprises at least one processor 202, at least one sensor 204 electronically connected to at least one processor 202, and at least one means for electronically connecting at least one broadcasting device (shown as 208 in FIG. 2C) to the system 206, wherein the at least one means for electronically connecting at least one broadcasting device 206 may be electronically connected to at least one processor 202, and computer executable instructions (not shown) readable by at least one processor 202, and operative to use at least one sensor 204 to determine how many persons (shown as 210 in FIG. 2C) or the identity of a person that is capable of perceiving a content (shown as 212 in FIG. 1C) broadcasted through at least one broadcasting device 208 electronically connected to system 200.

In some embodiments, at least one processor 202 may be any kind of processor, including, but not limited to, at single core processor, a multi core processor, a video processor, and the like.

At least one sensor 204 may be any kind of sensor, including, but not limited to, a video sensor, such as a camera, a 3D camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, and the like. At least one sensor 204 may be positioned in the same enclosure as at least one processor 202. Alternatively, at least one sensor 204 may be positioned remotely to at least one processor, such as near a couch, near a screen, or another location.

Figure 2C:
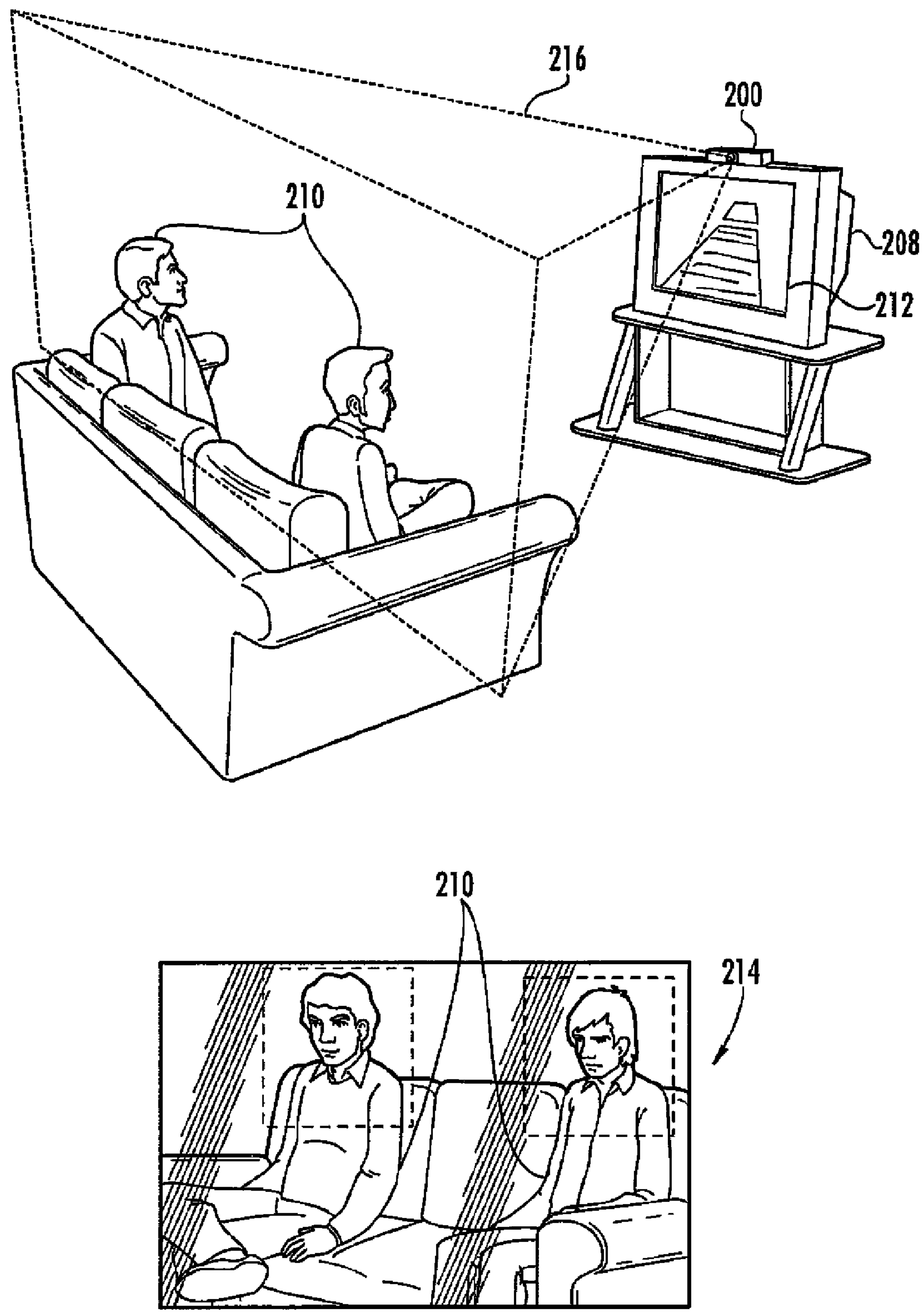
Figure 2D:
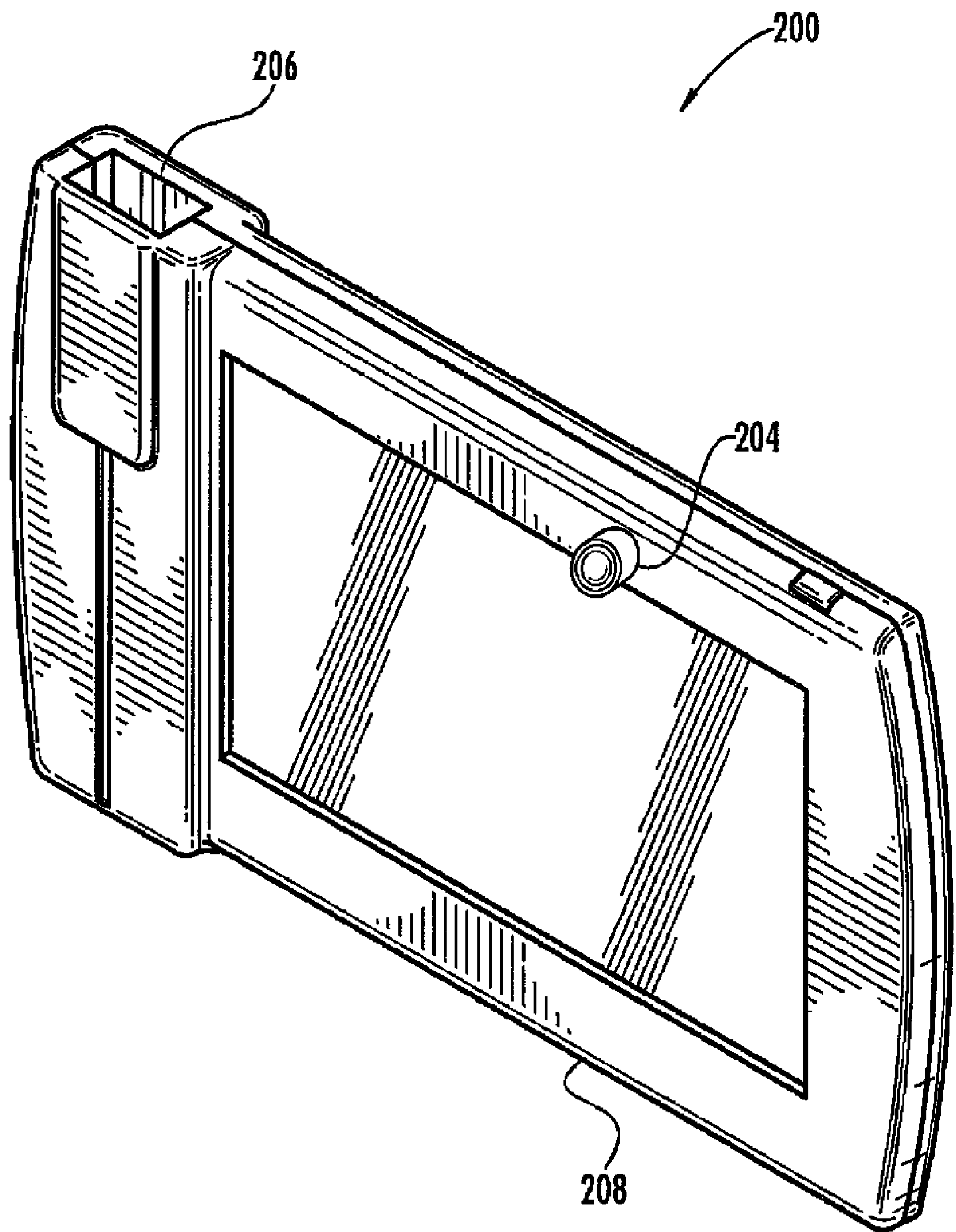
Figure 2E:
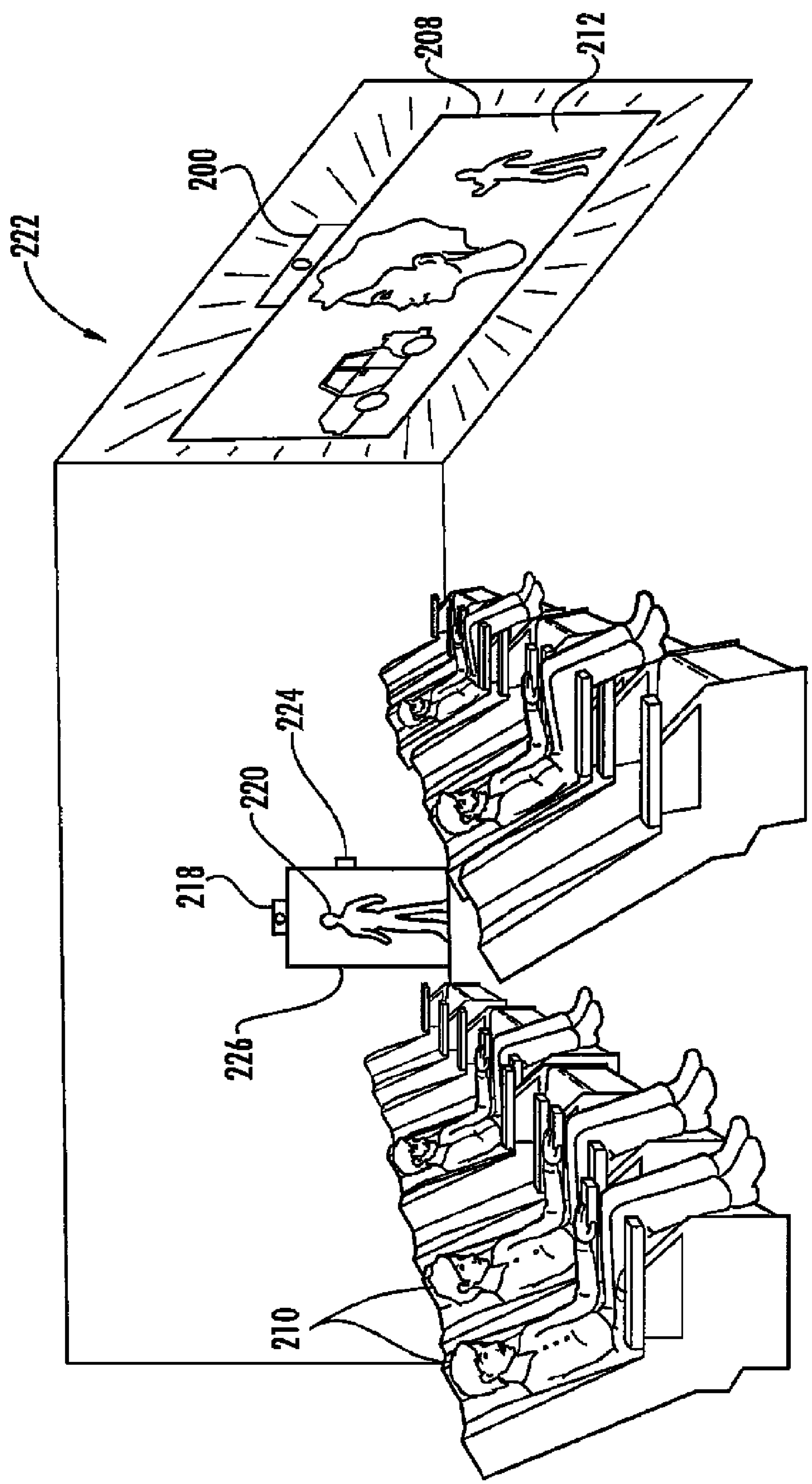

In some embodiments, at least one means for electronically connecting at least one broadcasting device to system 206 may include any such means, such as, but not limited to, an audio connection, such as a speaker connection, and/or a video connection, such as an HDMI® (High Definition Multimedia Interface), S-Video, or RCA connection, and the like. The broadcasting device 208 may be any kind of broadcasting device, such as a speaker system, headphones, a television (as shown in FIG. 2C), a computer screen, a projector and a screen (as shown in FIG. 2E), and the like.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA®, JAVASCRIPT®, HTML, XML, and other programming languages.

In one embodiment, the computer executable instructions may include object recognition software, such as image recognition software and/or firmware, which may be used to analyze the information (shown as 214 in FIG. 2C) captured by at least one sensor 204 and to determine the number of persons 210 present in the information 214, and consequently in the at least one sensor's 204 field of sensing 216. Such object recognition software may include image recognition software, which may, in turn, include facial recognition software, or may simply include general visual object recognition software. In another embodiment, the object recognition software may be audio based, being able to distinguish objects (e.g. persons) that are producing certain audio (such as breathing, talking, etc.). In yet a further embodiment, the object recognition software may use a plurality of at least one sensor 204 to determine how many persons or the identity of a person that is capable of perceiving the content 212.

In some embodiments, the computer executable instructions may be further operative to control content 212 based on the number of persons 210 or the identity of a person 210 that is determined to be perceiving content 212. In a further embodiment, the computer executable instructions may be operative to control the content 212 being broadcasted if the number of persons 210 or the identity of a person determined to be perceiving the content 212 exceeds the number or identity of persons authorized to perceive the content. In some embodiments, controlling the content 212 being broadcasted includes, but is not limited to, ceasing to broadcast the content 212, pausing the content 212, playing the content 212, or continuing to display the content 212. In some embodiments, for example, if at the outset of the content's 212 broadcast, the number of persons 210 who are determined to be capable of perceiving exceeds the number of persons 210 authorized to perceive, the content 212 may not even begin being broadcasted. Likewise, in one embodiment, if at the outset of the content's 212 broadcast, the identity of a person 210 who is determined to be capable of perceiving content 212 does not correspond to the identity of a person who is authorized to perceive content 212, the content 212 may not even begin being broadcasted. In further embodiments, if the number of persons 210 or the identity of a person 210 capable of perceiving the content 212 at the outset is in accordance with the number of persons or identity of persons authorized to perceive the content 212, but at a later time exceeds the number or identity authorized, the computer executable instructions may pause, freeze, or cease broadcasting the content 212 altogether. In a further embodiment, if the number of persons 210 perceiving the content 212 at first exceeds the number authorized, but then later is reduced to or below the number authorized, the computer executable instructions may be operative to begin or continue broadcasting the content 212. Likewise, if the identity of a person 210 determined to be capable of perceiving the content at first does not correspond with an authorized identity, but then later does correspond with an authorized identity, the computer executable instructions may be operative to being or continue broadcasting the content 212. The content 212 may be any kind of content, such as, but not limited to, a movie, a television show, a sports broadcast, such as a sports event, news, educational content, a radio show, an audio book, music, a scent, a smell, and the like.

In another embodiment, the computer executable instructions may be operative to allow for the number or identity of authorized persons to be changed or added to. In one embodiment, if the number of persons 210 or the identity of persons 210 determined to be capable of perceiving content 212 does not correspond to the number or identity of persons authorized to perceive the content, the computer executable instructions may be operative to allow a person 210 to increase the number of persons authorized to perceive the content, or to add a person's identity to the identities authorized to perceive the content. Such an operation may be accomplished by bringing up an electronic menu on a broadcasting device, such as a display device, that prompts a person 210 to increase the number of persons authorized to perceive the content 212, or to add an identity of a person to the identities authorized to perceive the content. Alternatively, the computer executable instructions may be operative to allow a person 210 to decrease the number of persons authorized to perceive the content, or to remove a person's identity from the identities authorized to perceive the content, which may, in turn, cause the person 210 to be charged less for the content's 212 broadcast.

It should be noted that the use of the terms "perceive," "perceiving," "view," and "viewing," are not meant to create the limitation that the persons must be actually perceiving content, but merely that they are capable of perceiving content, such as by being in the same room as where the content may be played.

In further embodiments, system 200 comprises at least one means for communicating with a local device, wherein the means for communicating with the local device may be electronically connected to the at least one processor 202. In some embodiments, such means may include a BLUETOOTH® module, a USB port, an infrared port, a network adapter, such as a WI-FI® (WLAN) card, and the like. The local device may be any kind of device, such as a television, a computer, a remote control, a telephone, a portable digital assistant, and the like.

In yet another embodiment, system 200 further comprises at least one means for communicating with a remote station, wherein the means for communicating may be electronically connected to the at least one processor 202. In some embodiments, the means for communicating with a remote station may be any kind of means, such as, but not limited to, a wireless modem, such as a GSM modem, a wired modem, an Ethernet adapter, a Wi-Fi adapter, and the like. In some embodiments, the remote station may be a media service provider, such as, but not limited to, a television service provider, a movie provider, a sports media provider, a radio station, an internet provider, a television station, a server computer, and the like. In such embodiments, the computer executable instructions may be further operative to use the at least one means for communicating with a remote station to transmit or receive information to or from the remote station. The information may include media content, such as television shows, sports broadcasts, movies, music, radio shows, smells, scents, and the like. The information may also include the number or identity persons authorized to view the media content, viewer content, billing information, and software updates. In some embodiments, a person may use system 200 to select and/or download the media to be viewed, and may select the amount of persons authorized to watch the media.

In one embodiment, system 200 may be positioned on, in, or near a display device, such as a television or computer monitor (as shown in FIG. 2C), a projector, a projector screen (as shown in FIG. 2E). In other embodiments, system 200 may be positioned within, or integrated with a broadcasting device, such as a television, tablet computer (as shown in FIG. 2D), personal computer, laptop computer, radio, smell producer, and the like.

With reference now to FIG. 2E, a further embodiment is shown, wherein system 200 may be positioned within or may be a part of a theatre, such as, but not limited to, a movie theatre, a home theatre, an office theatre, a hotel theatre, a condominium theatre, an auditorium, a restaurant theatre, a personal computer theatre, and the like.

In yet another embodiment, system 200 may further comprise at least one occupancy sensor 218 operative to determine a number of persons 220 entering or leaving a space 222 where content 212 may be played. At least one occupancy sensor 218 may be any kind of occupancy sensor 218, such as, but not limited to, a motion sensor, and infrared sensor, an infrared motion sensor, and the like. At least one occupancy sensor 218 may be used to determine how many persons 210 are capable of perceiving content 212. At least one occupancy sensor 218 may be electronically connected to and/or in electronic communication with at least one processor 202, at least one sensor 204, and/or at least one means 206 for electronically connecting at least one broadcasting device to system 200.

In a further embodiment, system 200 may comprise at least one means 224 for identifying a person 218 entering or leaving a space 222 where content 212 may be played. At least one means 224 for identifying a person 218, may include any kind of means for identifying a person, such as a biometric identifications means, such as, but not limited to, an eye scanner, a face scanner, a finger print scanner, a key reader, a card reader, a smart card reader, and the like. In some embodiments, at least one means 224 for identifying a person 218 may be used to determine the identity of persons 210 capable of perceiving content 212. At least one means 224 for identifying a person 218 may be electronically connected to and/or in electronic communication with at least one processor 202, at least one sensor 204, and/or at least one means 206 for electronically connecting at least one broadcasting device to system 200.

In yet a further embodiment, system 200 may comprise at least one means 226 for restricting access to a space 222 where content 212 may be played, wherein the restriction may be based on the number of persons or the identity of a person attempting to enter or leave space 222 where content 212 may be played. Means 226 for restricting access may be any kind of means for restricting access, such as a door, a lock, a turn style, a limited access elevator, a security guard, and the like. In some embodiments, at least one means 226 for restricting access to space 222 may be electronically connected to and/or in electronic communication with at least one processor 202, at least one sensor 204, and/or at least one means 206 for electronically connecting at least one broadcasting device to system 200

In another embodiment, a person may purchase authorization to perceive content 212 at a remote location, such as at home or in a hotel room, a remote terminal, online, or the like. The purchasing process may include identifying the number of person(s) or the identity of person(s) that will perceive the content 212. In some embodiments, at least one occupancy sensor 218 and/or at least one sensor 204 may be used to ensure that the number of persons 220 attempting to enter space 222 where content 212 may be played, or persons 210 that are capable of perceiving content 212, coincides with the number of persons identified during the purchase process. In another embodiment, at least one means 224 for identifying a person 220 and/or at least one sensor 204 may be used to ensure that the identity of a person 220 attempting to enter space 222, or person(s) 210 that are capable of perceiving content 212, coincides with the identity of person(s) identified during the purchase process.

In yet a further embodiment, if by any means, such as by using at least one sensor 204 and/or occupancy sensor 218, the number of persons 220 attempting to enter space 222, or the number of persons 210 that are capable of perceiving content 212 is deteiniined to exceed the number of persons authorized to perceive content 212, the at least one means 226 for restricting access to space 222 may be used to prevent further entry into space 222, and/or content 212 may cease playing or pause. In yet a further embodiment, if by any means, such as by using at least one sensor 204 and/or at least one means 224 for identifying a person 220, the identity of a person 220 attempting to enter space 222, or the identity of a person 210 that is capable of perceiving content 212 is determined to not correspond with the identity of a person authorized to perceive content 212, the at least one means 226 for restricting access to space 222 may be used to prevent further entry into space 222, and/or content 212 may cease playing or pause. Likewise, if by any means, such as those described above, the number and/or identity of persons attempting to enter space 222 and/or persons capable of perceiving content 212 is determined to be within authorized limits, the at least one means 226 for restricting access to space 222 may be used to allow entry into space 222, and/or content 212 may begin playing or continue playing.

Throughout the present disclosure, it should be understood that computer executable instructions, such as those in system 200, may be used to manipulate and use the various embodiments of systems and components thereof, such as at least one sensor 204, at least one occupancy sensor 218, at least one means 224 for identifying a person 220, and/or at least one means for restricting access 226.

Figure 3:
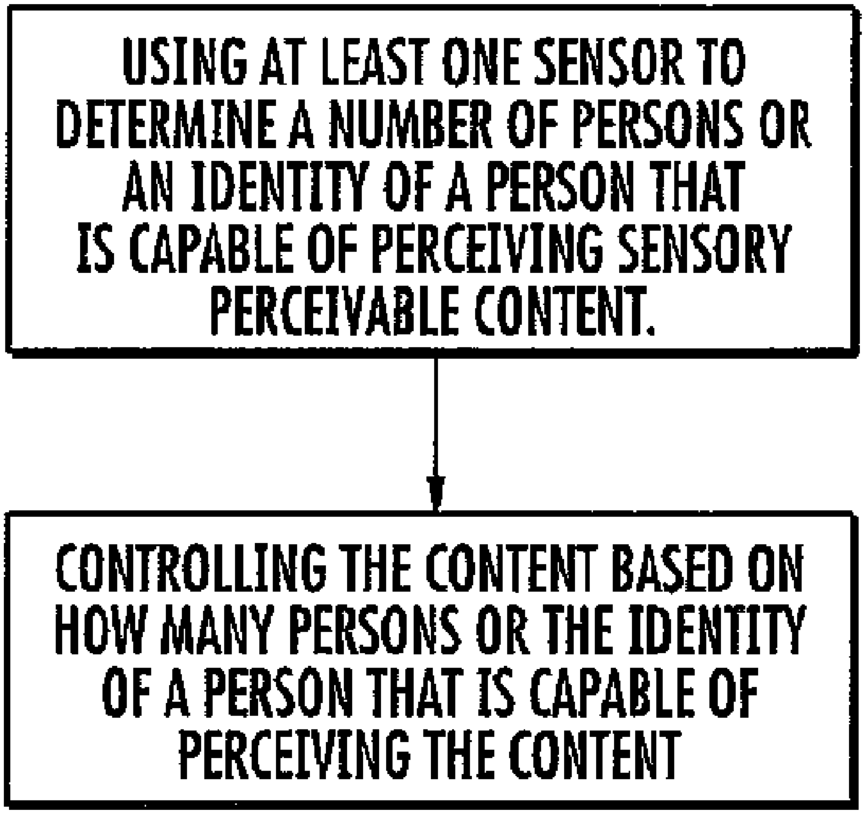
FIG. 3 shows a flow diagram representing a method in accordance with one embodiment.

Referring now to FIG. 3 shows a flow diagram representing an embodiment of method 300, wherein method 300 comprises using at least one sensor to determine the number of persons that are capable of perceiving sensory perceivable content (block 302), and controlling the content based on how many person(s) or the identity of person(s) that are determined to be capable of perceiving the content (block 304). In a further embodiment, method 300 comprises using a processor to carry out any and/or all of the steps of method 300 described above and elsewhere throughout the present disclosure.

In some embodiments, the sensor may be any kind of sensor, including, but not limited to, a visual sensor, an audio sensor, a tactile sensor, a thermal sensor, a chemical sensor, an electrical sensor, a capacitive sensor, a resistive sensor, a camera, 3D camera, an infrared camera, a thermal imaging camera, a microphone, any other type of sensor described herein, and the like.

In some embodiments, the sensory perceivable content may be audio content, such as music, dialogue, and the like, and/or visual content, such as images, text, movies, television shows, sports events, and the like. Alternatively, the content may be internet service. In some embodiments, the content may be tactile content, like vibrations or force feedback, while in other embodiments, the content may be perceived with the nose, such as smells, scents, and the like.

In a further embodiment of method 300, controlling the content based on how many person(s) or the identity of person(s) that are determined to be capable of perceiving the content comprises any or all of the following: pausing the content when the number of persons determined to be capable of perceiving the content exceeds a number of persons authorized to perceive the content, playing the content when the number of persons determined to be capable of perceiving the content is equal or less to the number of persons authorized to perceive the content, and ceasing the content when the number of persons determined to be capable of perceiving the content exceeds the number of persons authorized to perceive the content. In another embodiment of method 300, controlling the content based on how many person(s) or the identity of person(s) that are determined to be capable of perceiving the content comprises any or all of the following: pausing the content when the identity of person(s) determined to be capable of perceiving the content does not correspond with the identity of person(s) authorized to perceive the content, playing the content when the number of persons determined to be capable of perceiving the content corresponds with the identity of person(s) authorized to perceive the content, and ceasing the content when the identity of person(s) determined to be capable of perceiving the content does not correspond with the identity of person(s) authorized to perceive the content.

In a further embodiment, method 300 may be carried out in whole or in part, in a theatre, such as, but not limited to, a movie theatre, a home theatre, an office theatre, a hotel theatre, a condominium theatre, an auditorium, a restaurant theatre, a personal computer theatre, and the like.

In yet another embodiment, method 300 may further comprise using at least one occupancy sensor to determine a number of persons entering or leaving a space where the content may be played. The at least one occupancy sensor may be any kind of occupancy sensor, such as, but not limited to, a motion sensor, and infrared sensor, an infrared motion sensor, and the like. The at least one occupancy sensor may be used to determine how many persons are capable of perceiving content. The at least one occupancy sensor may be electronically connected to and/or in electronic communication with at least one processor.

In a further embodiment, method 300 may comprise using at least one means for identifying a person entering or leaving a space where the content may be played. The at least one means for identifying a person, may include any kind of means for identifying a person, such as a biometric identifications means, such as, but not limited to, an eye scanner, a face scanner, a finger print scanner, a key reader, a card reader, a smart card reader, and the like. In some embodiments, the at least one means for identifying a person may be used to determine the identity of persons capable of perceiving the content. The at least one means for identifying a person may be electronically connected to and/or in electronic communication with at least one processor.

In yet a further embodiment, method 300 may comprise using at least one means for restricting access to a space where the content may be played, wherein the restriction may be based on the number of persons or the identity of a person attempting to enter or leave the space where the content may be played. The means for restricting access may be any kind of means for restricting access, such as a door, a lock, a turn style, a limited access elevator, a security guard, and the like.

In another embodiment, a person may purchase authorization to perceive the content at a remote location, such as at home or in a hotel room, a remote terminal, online, or the like. The purchasing process may include identifying the number of person(s) or the identity of person(s) that will perceive the content. In some embodiments, the at least one occupancy sensor and/or the at least one sensor may be used to ensure that the number of persons attempting to enter the space where the content may be played, or persons that are capable of perceiving the content, coincides with the number of persons identified during the purchase process. In another embodiment, the at least one means for identifying a person and/or the at least one sensor may be used to ensure that the identity of a person attempting to enter the space, or person(s) that are capable of perceiving the content, coincides with the identity of person(s) identified during the purchase process.

In yet a further embodiment, if by any means, such as by using the at least one sensor and/or the occupancy sensor, the number of persons attempting to enter the space, or the number of persons that are capable of perceiving the content is determined to exceed the number of persons authorized to perceive the content, the at least one means for restricting access to the space may be used to prevent further entry into the space, and/or the content may cease playing or pause. In yet a further embodiment, if by any means, such as by using the at least one sensor and/or the at least one means for identifying a person, the identity of a person attempting to enter the space, or the identity of a person that is capable of perceiving the content is determined to not correspond with the identity of a person authorized to perceive the content, the at least one means for restricting access to the space may be used to prevent further entry into the space, and/or the content may cease playing or pause. Likewise, if by any means, such as those described above, the number and/or identity of persons attempting to enter the space and/or persons capable of perceiving the content is determined to be within authorized limits, the at least one means for restricting access to the space may be used to allow entry into the space, and/or the content may begin playing or continue playing.

Throughout the present disclosure, it should be understood that computer executable instructions, such as those in method 300, may be used to manipulate and use the various embodiments of systems and components thereof, such as the at least one sensor, the at least one occupancy sensor, the at least one means for identifying a person, and/or the at least one means for restricting access.

In a further embodiment, method 300 comprises any or all of the following steps: allowing at least one person to register for at least one broadcast of at least one program, using at least one image recording means to capture at least one image of the at least one person, and using at least one processor to analyze the image and determine how many persons are in the image, and begin, continue, or cease broadcasting or displaying the program based on how many persons are determined to be in the image. In some embodiments, method 300 further comprises using at least one processor to begin broadcasting the program if the amount of persons determined to be in the image corresponds to the amount of persons registered for the broadcast.

In some embodiments, method 300 further comprises using at least one processor to continue broadcasting the program if the amount persons determined to be in the image corresponds to the amount of persons registered for the broadcast.

In some embodiments, method 300 further comprises using at least one processor to cease broadcasting the program if the amount persons determined to be in the image does not correspond to the amount of persons registered for the broadcast.

In some embodiments, method 300 further comprises using at least one processor to carry out any of the aforementioned steps, or any other steps described in the present disclosure.

In some embodiments, method 300 may be implemented as a computer readable medium having computer executable instructions. The term "computer readable medium," as used throughout this disclosure, may refer to any computer readable medium, such as CD-ROMs, CD-Rs, CD-RWs, floppy disks, hard drives, flash drives, diskettes, solid state drives, tape drives, and any other form of computer readable medium.

In some embodiments method 300 may be integrated wholly, or in part, into systems 100 and 200 described above, as well as other systems and methods described throughout the present disclosure. In some embodiments, method 300 may be carried out using the various systems described throughout the present disclosure.

Hardware and Operating Environment

This section provides an overview of example hardware and the operating environments in conjunction with which embodiments of the inventive subject matter may be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 4:
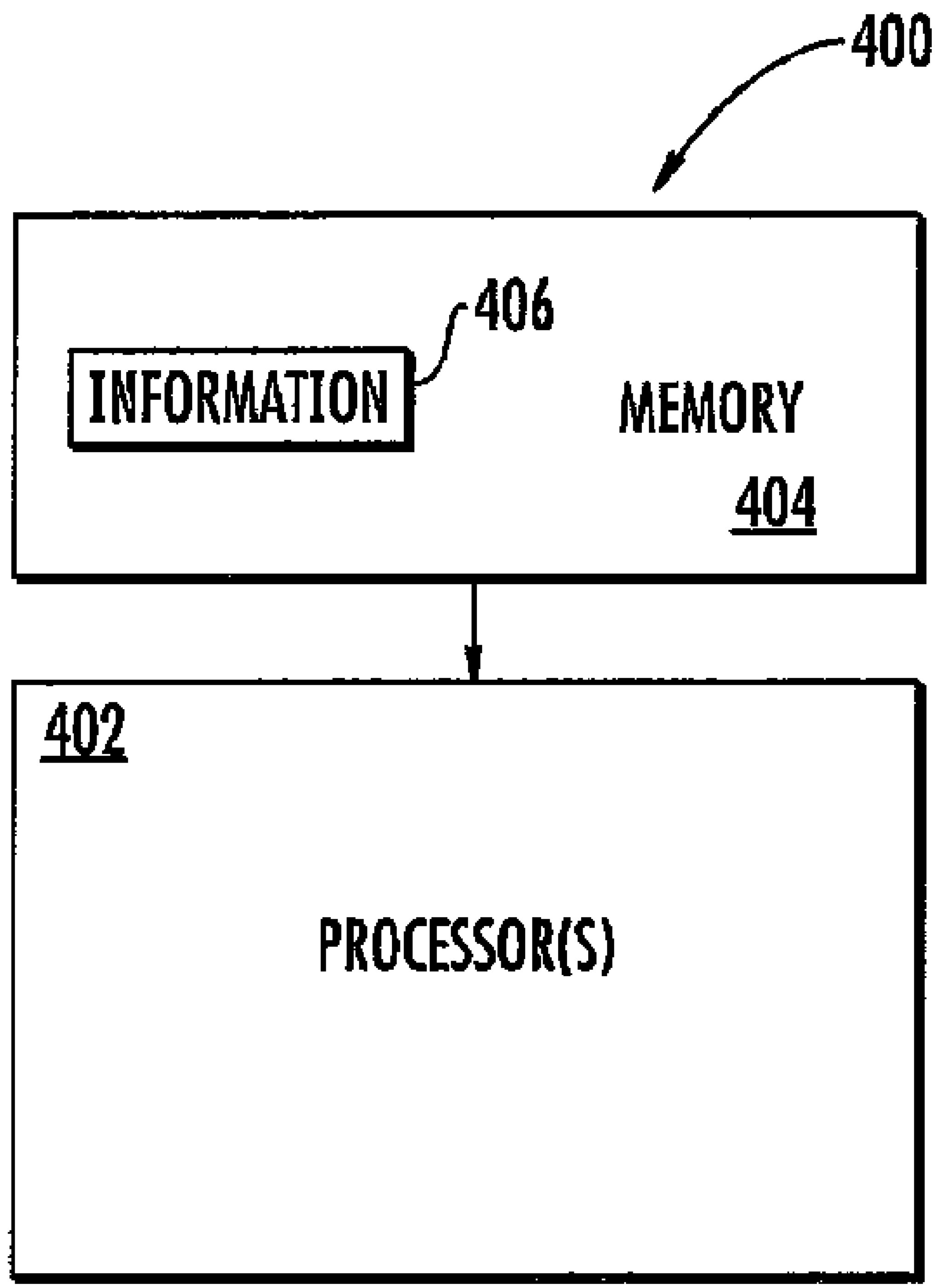
FIG. 4 shows an article in accordance with one embodiment.

FIG. 4 is a block diagram representing an article according to various embodiments. Such embodiments may comprise a computer, a memory system, a magnetic or optical disk, some other storage device, or any type of electronic device or system. The article 400 may include one or more processor(s) 402 coupled to a machine-accessible medium such as a memory 404 (e.g., a memory including electrical, optical, or electromagnetic elements). The medium may contain associated information 406 (e.g., computer program instructions, data, or both) which, when accessed, results in a machine (e.g., the processor(s) 402) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:

a. at least one processor;

b. at least one sensor electronically connected to the at least one processor;

c. at least one means for electronically connecting at least one media content broadcasting device to the system, wherein the at least one means for electronically connecting at least one media content broadcasting device is electronically connected to the at least one processor; and d. computer executable instructions readable by the at least one processor and operative to:

i. use a user input device to allow at least one user to purchase authorization to perceive media content to be broadcasted on the at least one media content broadcasting device, wherein purchasing authorization to perceive media content to be broadcasted on the at least one media content broadcasting device comprises allowing the at least one user to purchase authorization for a number of persons to perceive media content to be broadcasted on the at least one media content broadcasting device;

ii. use the at least one sensor to determine a number persons that are capable of perceiving the media content broadcasted through the at least one media content broadcasting device; and iii. control the media content based on the number of persons that is determined to be capable of perceiving the media content, wherein controlling the media content includes any or all of the following: ceasing the media content, pausing the media content, playing the media content, or continuing to play the media content.

2. The system of claim 1, wherein the computer executable instructions are further operative to control the media content if the number of persons determined to be capable of perceiving the media content exceeds or does not correspond to the number of persons authorized to perceive the media content.

3. The system of claim 1, wherein the computer executable instructions are further operative to use the user input device to allow the at least one user to change or add to the number of persons authorized to perceive the media content.

4. The system of claim 1, further comprising at least one means for communicating with a local device, wherein the means for communicating with a local device is electronically connected to the at least one processor.

5. The system of claim 1, further comprising at least one means for communicating with a media content provider, wherein the at least one means for communicating is electronically connected to the at least one processor.

6. The system of claim 5, wherein the computer executable instructions are further operative to use the at least one means for communicating with a media content provider to transmit or receive information to or from the media content provider.

7. The system of claim 6, wherein the information is any or all of the following types of information: media content, the number of persons authorized to view the media content, billing information, and software updates.

8. The system of claim 1, wherein the computer executable instructions are operative to use the at least one media content broadcasting device to prompt the at least one user to add to or change the number of persons authorized to perceive the media content when it is determined that the number of persons capable of perceiving the media content is greater than or not equal to the number of persons authorized to perceive the media content.

9. The system of claim 1, further comprising at least one occupancy sensor positioned near an entrance or exit to a space where the media content is played, wherein the at least one occupancy sensor is operative to determine a number of persons entering or leaving the space where the media content is played.

10. The system of claim 1, wherein purchasing authorization to perceive media content comprises paying a fee for authorization to perceive media content, wherein the fee is based in whole, or in part, on the number of persons authorized to perceive the media content.

11. The system of claim 1, further comprising at least one means for restricting access to a space where the media content is played, wherein the restriction is based on the number of persons attempting to enter or leave the space where the media content is played.

12. A method comprising:

a. using at least one user input device to allow at least one user to purchase authorization to perceive media content, wherein purchasing authorization to perceive media content comprises purchasing authorization for a number of persons to perceive the media content;

b. using at least one sensor to determine a number of persons that are capable of perceiving the media content; and c. controlling the media content based on the number of persons determined to be capable of perceiving the media content, wherein controlling the media content based on a number of persons determined to be capable of perceiving the media content comprises wherein controlling the media content includes any or all of the following: ceasing the media content, pausing the media content, playing the media content, or continuing to play the media content.

13. The method of claim 12, further comprising using the at least one media content broadcasting device to prompt the at least one user to add to or change the number of persons authorized to perceive the media content when it is determined that the number of persons capable of perceiving the media content is greater than or not equal to the number of persons authorized to perceive the media content.

14. The method of claim 12, wherein the media content comprises a movie.

15. The method of claim 12, wherein controlling the media content based on a number of persons determined to be capable of perceiving the media content comprises:

a. playing the media content when the number of persons determined to be capable of perceiving the media content is equal to or less than the number of persons authorized to perceive the media content; and b. ceasing to play the media content when the number of persons determined to be capable of perceiving the media content exceeds the number of persons authorized to perceive the media content.

16. The method of claim 12, further comprising using at least one occupancy sensor positioned near an entrance or exit to a space where the media content is played to determine a number of persons entering or leaving a space where the media content is played.

17. The method of claim 12, wherein purchasing authorization to perceive media content comprises paying a fee for authorization to perceive media content, wherein the fee is based in whole, or in part, on the number of persons authorized to perceive the media content.

18. The method of claim 12, further comprising restricting access to a space where the media content is played based on the number of persons attempting to enter or leave the space where the media content is played.

19. A non-transitory computer readable medium having computer executable instructions for performing a method comprising:

a. using at least one user input device to allow at least one user to purchase authorization to perceive media content, wherein purchasing authorization to perceive media content comprises purchasing authorization for a number of persons to perceive the media content;

b. using at least one sensor to determine a number of persons that are capable of perceiving the media content; and c. controlling the media content based on the number of persons determined to be capable of perceiving the media content, wherein controlling the media content includes any or all of the following: ceasing the media content, pausing the media content, playing the media content, or continuing to play the media content.

20. The non-transitory computer readable medium of claim 19, wherein controlling the media content based on a number of persons determined to be capable of perceiving the media content comprises:

a. playing the media content when the number of persons determined to be capable of perceiving the media content is equal to or less than the number of persons authorized to perceive the media content; and b. ceasing to play the media content when the number of persons determined to be capable of perceiving the media content exceeds the number of persons authorized to perceive the media content.

21. The non-transitory computer readable medium of claim 19, wherein the computer executable instructions are further operative to use at least one occupancy sensor positioned near an entrance or exit to a space where the media content is played to determine a number of persons entering or leaving a space where the media content is played.

22. The non-transitory computer readable medium of claim 19, wherein purchasing authorization to perceive media content comprises paying a fee for authorization to perceive media content, wherein the fee is based in whole, or in part, on the number of persons authorized to perceive the media content.

23. The non-transitory computer readable medium of claim 19, wherein the computer executable instructions are further operative to restrict access to a space where the media content is played based on the number of persons attempting to enter or leave the space where the media content is played.

24. The system of claim 1, wherein the computer executable instructions are operative to allow the at least one user to select or change the number of persons authorized to perceive the content.

25. The method of claim 12, further comprising allowing the at least one user to select or change the number of persons authorized to perceive the content.

* * * * *

UNITED STATES PATENT AND TRADEMARK OFFICE

CERTIFICATE OF CORRECTION

PATENT NO. : 8,355,951 B1
APPLICATION NO. : 12/702762
DATED : January 15, 2013
INVENTOR(S) : Isaac S. Daniel It is certified that error appears in the above-identified patent and that said Letters Patent is hereby corrected as shown below:

In the Claims, correct the following claims 12, 24 and 25 as follows:

Column 13, Claim 12. A method comprising:

a. using at least one user input device to allow at least one user to purchase authorization to perceive media content, wherein purchasing authorization to perceive media content comprises purchasing authorization for a number of persons to perceive the media content;

b. using at least one sensor to determine a number-of persons that are capable of perceiving the media content; and c. controlling the media content based on the number of persons determined to be capable of perceiving the media content, wherein controlling the media content includes any or all of the following: ceasing the media content, pausing the media content, playing the media content, or continuing to play the media content.

Column 16, Claim 24. The system of claim 1, wherein the computer executable instructions are operative to allow the at least one user to select or change the number of persons authorized to perceive the media content.

Column 16, Claim 25. The method of claim 12, further comprising allowing the at least one user to select or change the number of persons authorized to perceive the media content.

Signed and Sealed this
Eleventh Day of June, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,355,951 B1
APPLICATION NO. : 12/702762
DATED : January 15, 2013
INVENTOR(S) : Isaac S. Daniel It is certified that error appears in the above-identified patent and that said Letters Patent is hereby corrected as shown below:

In the Claims:

Column 13, lines 50 - 67, Claim 12 should read:

--A method comprising:

a. using at least one user input device to allow at least one user to purchase authorization to perceive media content, wherein purchasing authorization to perceive media content comprises purchasing authorization for a number of persons to perceive the media content;

b. using at least one sensor to determine a number-of persons that are capable of perceiving the media content; and c. controlling the media content based on the number of persons determined to be capable of perceiving the media content, wherein controlling the media content includes any or all of the following: ceasing the media content, pausing the media content, playing the media content, or continuing to play the media content.--

Column 16, lines 3 - 6, Claim 24 should read:

-- The system of claim 1, wherein the computer executable instructions are operative to allow the at least one user to select or change the number of persons authorized to perceive the media content.--

Column 16, lines 7 - 9, Claim 25 should read:

--The method of claim 12, further comprising allowing the at least one user to select or change the number of persons authorized to perceive the media content.--

This certificate supersedes the Certificate of Correction issued June 11, 2013.

Signed and Sealed this
Second Day of July, 2013

Teresa Stanek Rea
*Acting Director of the United States Patent and Trademark Office*